US007688181B2

(12) United States Patent
Cargonja et al.

(10) Patent No.: US 7,688,181 B2
(45) Date of Patent: Mar. 30, 2010

(54) METHOD AND APPARATUS FOR AVOIDING OVERPOLLING

(75) Inventors: Nikola Cargonja, San Carlos, CA (US); David B. Koons, San Jose, CA (US)

(73) Assignee: Savi Technology, Inc., Mountain View, CA (US)

( * ) Notice: Subject to any disclaimer, the term of this patent is extended or adjusted under 35 U.S.C. 154(b) by 852 days.

(21) Appl. No.: 11/541,441

(22) Filed: Sep. 29, 2006

(65) Prior Publication Data

US 2008/0068131 A1   Mar. 20, 2008

Related U.S. Application Data

(60) Provisional application No. 60/842,628, filed on Sep. 6, 2006.

(51) Int. Cl.
 *H04Q 5/22* (2006.01)
(52) U.S. Cl. ............... 340/10.1; 340/10.33; 340/10.34; 455/343.2
(58) Field of Classification Search .............. 340/10.1, 340/10.33–10.34, 539.3, 693.3, 7.32–7.38; 455/343.1, 343.2, 574; 370/311, 313, 314; 235/375, 377, 385
See application file for complete search history.

(56) References Cited

U.S. PATENT DOCUMENTS 5,606,313 A * 2/1997 Allen et al. ............... 340/10.31
6,329,944 B1 * 12/2001 Richardson et al. ........... 342/42
6,593,845 B1    7/2003 Friedman et al.
7,286,040 B2 * 10/2007 Karabinis .................. 340/10.1
7,511,604 B2 *  3/2009 Raphaeli et al. ............ 340/10.2
2001/0048363 A1   12/2001 Trosper
2005/0084075 A1    4/2005 Kotzin
2008/0061943 A1 *  3/2008 Wu et al. ................. 340/10.33

OTHER PUBLICATIONS

PCT Search Report (Forms PCT/ISA/220 and 210) and PCT Written Opinion (Form PCT/ISA/237) mailed by the U.S. Patent Office on Feb. 1, 2008 in PCT Application No. PCT/US07/76752, 10 pages.

* cited by examiner

*Primary Examiner*—Daniel Wu
*Assistant Examiner*—Nay Tun
(74) *Attorney, Agent, or Firm*—Haynes and Boone, LLP (57) ABSTRACT

A tag can switch between first and second modes of operation, and consumes less power in the first mode. In the second mode, the tag can receive wireless signals having successive first and second portions. If the tag identifies a repetitive pattern of the wireless signals, the tag ignores the second portions of the signals. Otherwise the tag receives the second portions. In another embodiment, while in the second mode, the tag can receive wireless signals having successive first, second and third portions. The tag switches between the first and second modes at one rate until it detects the first portion, and then switches at a higher rate until it detects the second portion, and then stays in the second mode and receives the third portion.

38 Claims, 5 Drawing Sheets

METHOD AND APPARATUS FOR AVOIDING OVERPOLLING

This application claims the priority under 35 U.S.C. §119 of provisional application No. 60/842,628 filed Sep. 6, 2006.

FIELD OF THE INVENTION

This invention relates in general to tracking techniques and, more particularly, to techniques for tracking items using radio frequency identification technology.

BACKGROUND

Often there are storage facilities where a large number of assets are stored. In order to track the assets, a radio frequency identification (RFID) tag is provided on each asset. Each tag includes a receiver that can receive wireless signals, and a transmitter that can transmit wireless signals. The storage facility has at least one stationary reader with a transmitter and receiver. Each reader can engage in two-way communications with a number of tags using radio frequency (RF) wireless signals. In this regard, a reader in this type of environment typically does periodic polling of the tags within its transmission range, in order to see if any new tags/assets have arrived, and in order to see if any tags/assets that were previously present have departed. This permits automated inventory control.

One common technique for polling tags is to have a reader transmit a wireless "wakeup" signal every 30 seconds. The wakeup signal asks that nearby tags each transmit a wireless reply in order to identify themselves. The tags operate on battery power. To conserve battery power, tags typically have multiple operating modes, including a normal operational mode and also a low power "sleep" or "rest" mode, in which most but not all of the tag's circuitry is powered down in order to reduce battery drain. The tags remain in the low power sleep mode most of the time, but every few seconds they each switch to the normal operational mode for a few milliseconds, in order to check for the presence of a wakeup signal. If no wakeup signal is detected, the tag returns to its low power sleep mode. But if a wakeup signal is detected, the tag remains in the normal operational mode a little longer, in order to receive the entire signal from the reader, and then transmit a reply back to the reader.

Even though the tags are in the low power sleep mode most of the time, the small amounts of time spent in the normal operational mode add up over a long period of time. And where a tag remains in the same location for a long period of time, the tag spends a significant amount of time and battery power receiving and responding to numerous wakeup signals, without telling the reader much beyond what the tag previously told the reader in earlier communications. This is referred to herein as "overpolling", and involves unnecessary power drain on the batteries of the tags.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
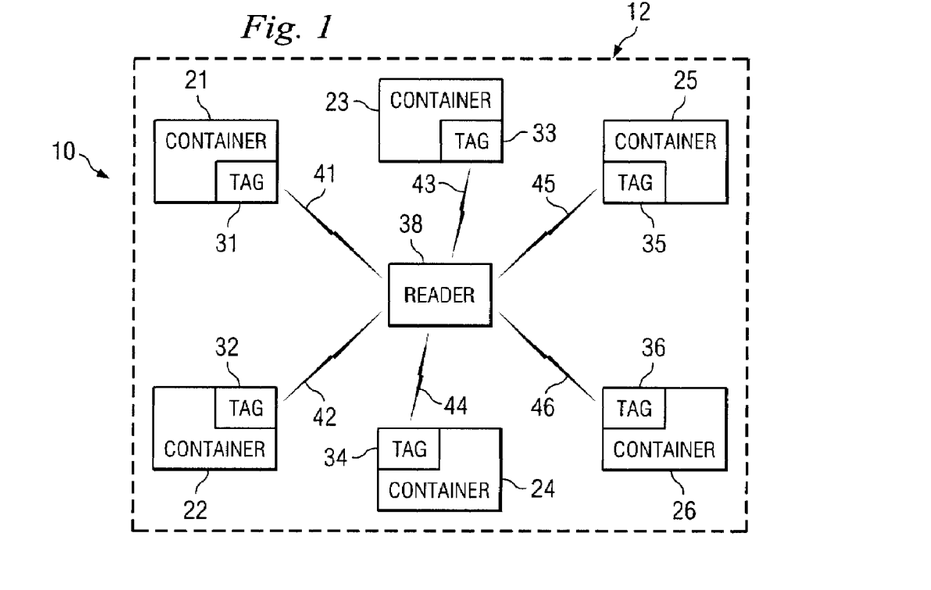
FIG. 1 is a block diagram of a configuration that includes several radio frequency identification tags and a reader in a storage facility.

FIG. 1 is a block diagram of a configuration 10 that embodies aspects of the present invention. A facility such as a warehouse or outdoor yard is represented diagrammatically by broken lines 12. A plurality of assets 21-26 are present in the facility 12. In the disclosed embodiment, the assets are shipping containers of a known type. Alternatively, however, the assets 21-26 could be any of a wide variety of other types of items that need to be tracked. Each of the assets 21-26 has thereon a respective radio frequency identification (RFID) tag 31-36. The tags 31-36 are each similar to tags that are generally known in the art, except for certain unique capabilities that are discussed in more detail later.

A reader 38 of a known type is stationarily mounted in a central region of the facility 12, for example on a ceiling or on a pole. As indicated diagrammatically at 41-46, the reader 38 can transmit radio frequency (RF) wireless signals that can be received by each of the tags 31-36 within the transmission range of the reader, and in addition the tags 31-36 can transmit RF signals to the reader 38.

From time to time, some assets and their tags may be removed from the facility 12, and other assets with tags may be introduced into the facility 12. The reader 38 is used to maintain an inventory of the assets that are currently present within the facility 12. In particular, the reader 38 periodically transmits a wireless signal that is received by each of the tags 31-36 in the facility 12 that are within the transmission range of the reader. The tags 31-36 will then transmit a reply to identify themselves, so that the reader 38 knows which tags and associated assets are currently present in the facility 12. The interaction between the tags and the reader is described in more detail below.

Figure 2:
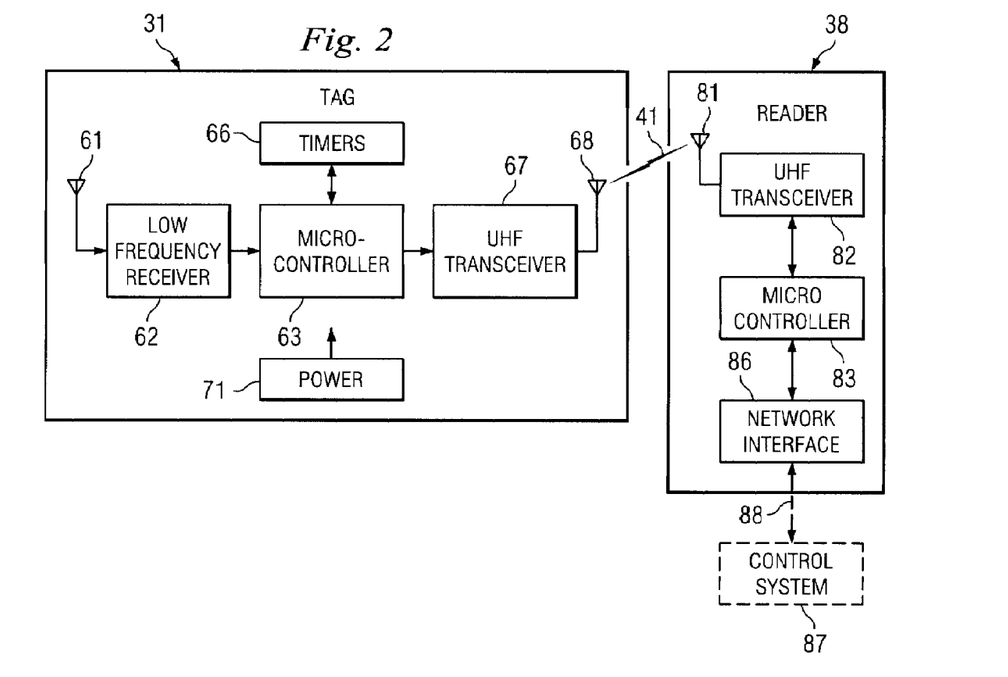
FIG. 2 is a block diagram depicting part of the structure shown in FIG. 1, including the reader and one of the tags.

The tags 32-36 in FIG. 1 are effectively identical to the tag 31, and therefore only the tag 31 is described below in more detail. In this regard, FIG. 2 is a block diagram showing a portion of the structure from FIG. 1, including the tag 31, the reader 38, and the RF signals 41 that can be transmitted between the reader and tag.

The tag 31 includes a receiving antenna 61 that can receive low frequency signpost signals of a type known in the art. The signpost signals are not relevant to an understanding of the present invention, and are therefore not described here in detail. The antenna 61 is coupled to a low-frequency receiver 62 of a known type. The receiver 62 extracts information from the signpost signals, and then supplies this information to a microcontroller 63. As known by persons skilled in the art, a microcontroller is an integrated circuit that includes a microprocessor, a read-only memory (ROM) that stores a computer program and static data for the microprocessor, and a random access memory (RAM) in which the microprocessor can store data that changes dynamically during system operation. The tag 31 also includes several timers 66 that each are coupled to the microcontroller 63, and that are discussed in more detail later. Although FIG. 2 shows the timers 66 implemented in hardware, the timers 66 could alternatively be implemented in software. The microcontroller 63 is coupled to a ultra high frequency (UHF) transceiver 67, and the transceiver 67 is in turn coupled to a UHF antenna 68. The transceiver 67 and the antenna 68 are used to receive and send the RF signals 41. The tag also includes a power source 71 in the form of a lithium battery, which provides operating power to circuitry within the tag.

The reader 38 includes a UHF antenna 81 and a UHF transceiver 82. The antenna 81 and the transceiver 82 are used to send and receive RF signals such as those shown at 41. The transceiver 82 is coupled to a microcontroller 83, which in turn is coupled to a network interface circuit 86. The network interface circuit 86 is coupled through a network 88 to a central control system 87. In the disclosed embodiment, the network 88 is a type of network known in the art as an Ethernet network. However, the network 88 could alternatively be any other type of suitable network.

Figure 3:
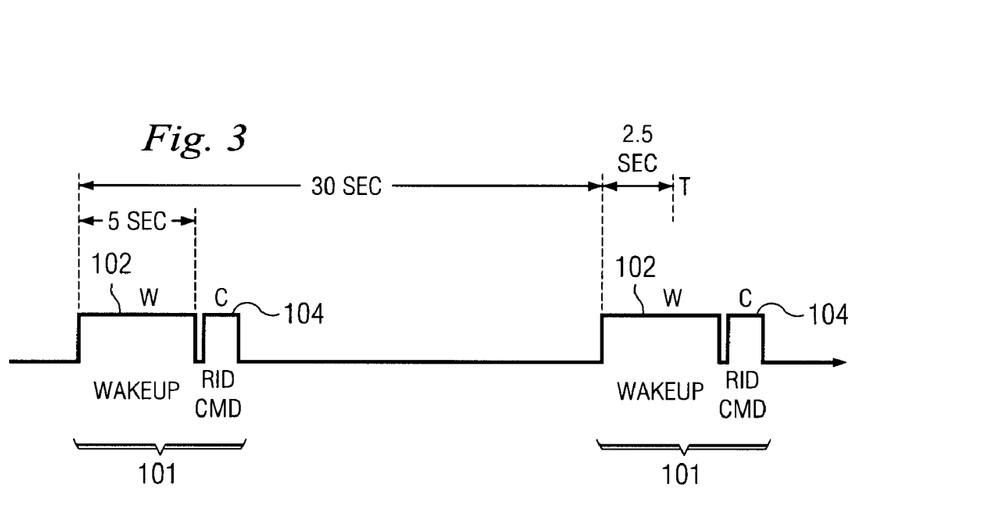
FIG. 3 is a timing diagram showing two occurrences of a wireless signal that is periodically transmitted by the reader of FIG. 1 to the tags.

FIG. 3 is a timing diagram showing two occurrences of a wireless signal 101 that is periodically transmitted by the reader 38 to tags within the facility 12 (FIG. 1). In particular, the reader 38 transmits a wireless signal 101 once every 30 seconds. However, the time interval between successive wireless signals 101 could have some other duration. Each wireless signal 101 begins with a wakeup portion "W" that is shown at 102, and that is followed by a collect portion "C" shown at 104. The wakeup portion 102 is a 31.25 KHz tone that lasts 5 seconds. This is one industry standard, but there are other standards, including a recent ISO standard that provides for a range of 2.4 to 4.8 seconds. The present invention is compatible with these standards, as well as a wide variety of other configurations.

The collect portion 104 contains information, including but not limited to a reader identification (RID) and a command (CMD). The RID is a code uniquely identifying the particular reader 38 that is transmitting the wireless signal 101. The command CMD could be any of a number of different commands that the reader can send to tags. For purposes of the present discussion, it is assumed that the command CMD is a "collect" command that instructs each tag receiving it to send the reader a wireless signal containing information identifying that particular tag. The tag's reply may also possibly contain some information about the asset associated with that tag.

As mentioned above in association with FIGS. 1 and 2, the tags 31-36 each operate on battery power. In order to conserve battery power, the tags each have multiple operational modes, including a low power SLEEP mode in which most but not all of the circuitry in the tag is powered down in order to reduce battery drain. The tags remain in the low power SLEEP mode most of time, but every few seconds each tag switches to a different operational mode in which the tag powers up more of its circuitry in order to check for the presence of one of the wakeup signals 101 (FIG. 3). If no wakeup signal is detected, the tag returns to its low power SLEEP mode. On the other hand, if a wakeup signal is detected, the tag may take some appropriate action.

Although each tag is in a low power SLEEP mode most of the time, the small amounts of time spent in other operational modes add up over time. And if a tag remains in the same location for a relatively long period of time, the tag spends a significant amount of time and power receiving and replying to numerous wakeup signals, typically without telling the reader 38 much the reader did not already know. This is referred to in this disclosure as "overpolling", and represents an undesirable level of power drain on the battery in each tag. The following discussion explains several ways in which tags can operate in new and unique ways to reduce or avoid the affects of overpolling.

Figure 4:
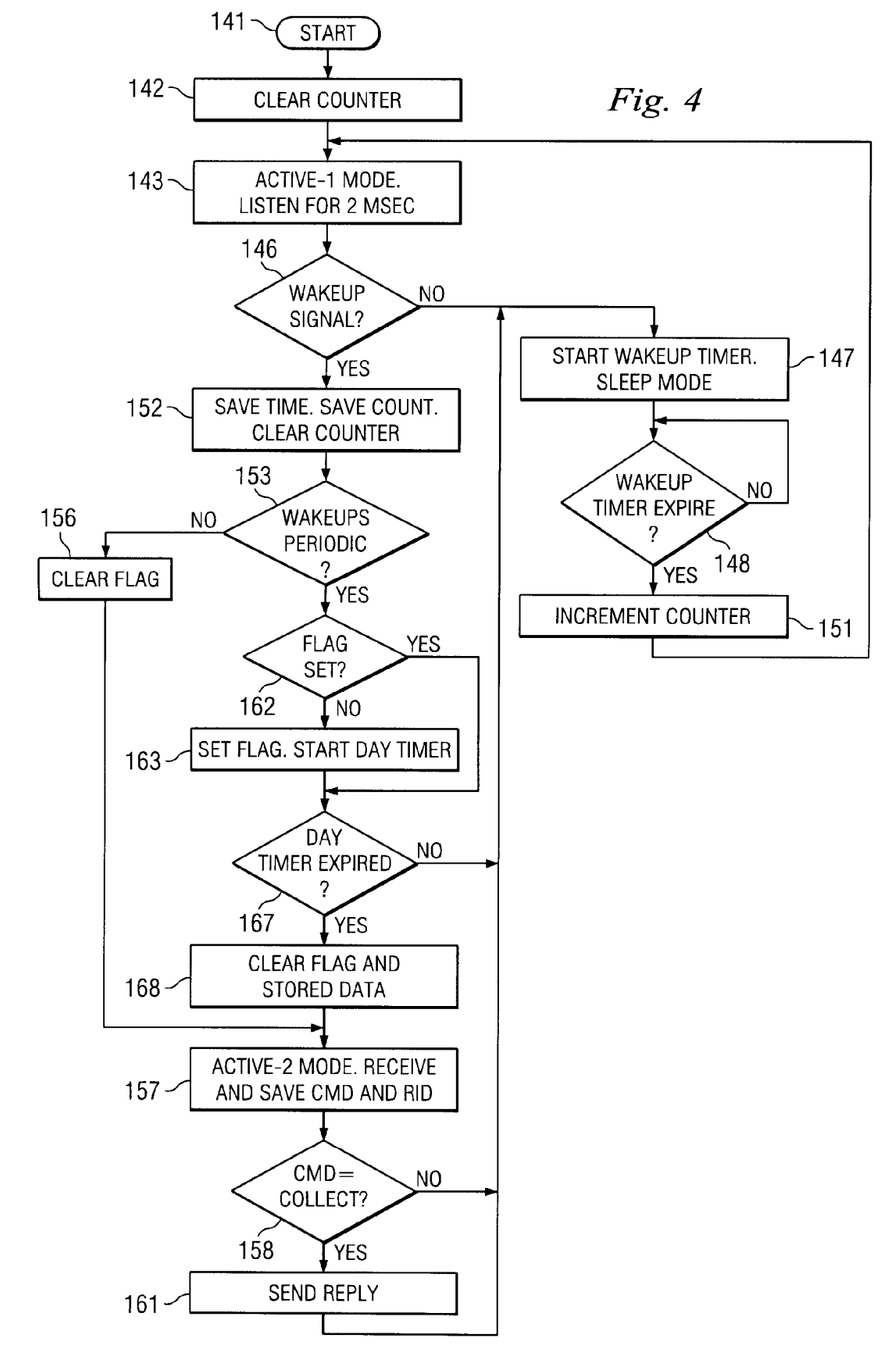
FIG. 4 is a flowchart showing a technique used by each of the tags of FIG. 1 to respond to polling inquiries from the reader.

More specifically, FIG. 4 is a flowchart showing a technique used by each of the tags 31-36 to respond to polling inquiries from the reader 38. Processing begins in block 141, and proceeds to block 142, where the tag clears a counter that is maintained in software. Control then proceeds to block 143, where the tag enters an ACTIVE-1 operational mode. The first time the tag enters the block 143, the tag may already be in the ACTIVE-1 mode. Typically, however, the tag will be in its SLEEP mode when it enters block 143, and will then switch to its ACTIVE-1 mode. Switching to the ACTIVE-1 mode includes turning on some additional circuitry, including the receiver circuitry in the tag's UHF transceiver 67 (FIG. 2). Switching on this additional circuitry has the effect of increasing the power consumption of the tag. The tag then listens for the presence of the wakeup portion 102 of a wireless signal 101 from any reader, such as the reader 38. If the tag detects a wakeup portion 102, then it proceeds immediately to block 146. On the other hand, if it does not detect a wakeup portion 102 within 2 milliseconds, it also proceeds to block 146.

If the tag did not detect a wakeup portion 102, then it proceeds from block 146 to block 147, where it starts one of the timers 66 (FIG. 2), which is referred to here as a "wakeup" timer. The wakeup timer is set for a time interval of 2.3 seconds. The tag then switches back to its SLEEP mode and turns off some circuitry, including the receiver circuitry in its transceiver 67. Then, at block 148, it waits for the wakeup timer to expire. After 2.3 seconds, the wakeup timer will expire, and the tag then proceeds to block 151, where it increments the counter. Control then proceeds back to block 143, in order to check again for the presence of the wakeup portion 102 of a wireless signal 101 from any reader.

As discussed above in association with FIG. 3, the wakeup portion 102 has a duration of 5 seconds. The 2.3 second interval measured by the wakeup timer has intentionally been selected to be slightly less than half the duration of the wakeup portion 102. Thus, during any wakeup portion 102, each tag should normally check for the wakeup portion at least twice, and occasionally three times.

Eventually, the tag will detect a wakeup portion 102 in blocks 143 and 146. Control will then proceed from block 146 to block 152, where the tag will save the time when it detected the wakeup signal, and also the count value present in the counter. This count value represents the number of times that the tag checked for the occurrence of a wakeup portion 102 between the current wakeup portion 102 and the most recent prior wakeup portion 102. The tag then clears the counter, and proceed to block 153. In block 153, the tag evaluates whether it is receiving wakeup signals according to a periodic pattern. This is discussed in more detail later. For the moment, it is assumed that the tag does not identify a periodic pattern of wakeups, and therefore proceeds from block 153 to block 156.

In block 156, the tag clears a software flag. When this flag is set, it indicates that the tag has identified a periodic pattern of wakeup signals. Since it is currently being assumed that the tag has not identified a periodic pattern, the flag is cleared in block 156 in order to reflect this. The tag then proceeds to block 157, where it switches to an ACTIVE-2 operational mode and turns on more circuitry, which may further increase its power consumption. For example, at block 143 the tag turned on the receiver circuitry within its transceiver 67 (FIG. 2). At block 157, the tag can turn on the transmitter circuitry in the transceiver 67, so that the receiver circuitry and the transmitter circuitry are both operational and consuming power. Then, still in block 157, the tag waits for and receives the collect portion 104 of the wireless signal 101. The tag saves information present in the collect portion 104, including the reader identification RID and the command CMD.

The tag then proceeds from block 157 to block 158, where it checks to see if the command CMD is a "collect" command, or in other words a request by the reader 38 that the tag transmit a wireless signal that identifies the tag, and that also possibly identifies the asset associated with that tag. In response to receipt of a collect command, the tag proceeds from block 158 to block 161, where it prepares and transmits a reply to the reader 38, in the form of a wireless signal. Control then proceeds to block 147, where the tag begins the process of waiting for the next wakeup portion 102, as already discussed above.

Referring again to block 153, and as explained above, the tag evaluates whether wakeup signals are occurring in a periodic manner. As discussed above in association with FIG. 3, it is being assumed for purposes of this explanation that the reader 38 transmits one of its wireless signals 101 every 30 seconds. Consequently, after the tag has received several of these wireless signals 101, and has replied to each of them at block 161, the tag is in a position to evaluate whether these received wakeup signals appear to define some form of periodic pattern. There are several factors that the tag can take into account.

For example, as discussed above, in block 157 the tag saved the reader identification RID and command CMD from each of the last several wireless signals 101 it has received. Consequently, the tag can determine whether it is receiving a series of wireless signals that each contain the same command and are from the same reader. For example, as discussed above, the tag saves at block 152 the time that it receives each wireless signal, and also a count of the number of times that it checked for a wireless signal between each pair of successive wireless signals received. If the tag compares the stored times associated with successive wireless signals, the tag will determine that it is receiving wireless signals on a regular and periodic basis every 30 seconds.

In block 152, the tag also saves count values representing the number of times that it checked for a wireless signal between each pair of successive wireless signals it receives. If the tag compares the stored count values, the tag will find that it is performing an average of 30/2.3=13.04 wakeup detections between each successive pair of received wireless signals. As a practical matter, due to timer drift within the tag 31 and/or the reader 38, successive counts may have values that vary. For example, successive count values might have respective values of 12, 14, 10, 11, and 13. Consequently in evaluating a series of count values, the tag may take each count value and determine whether it falls within a selected range of values, such as a range of 10-16, inclusive. If several successive counts have values that all fall within this range, the tag may conclude that it has identified a periodic pattern of the wakeup portions of wireless signals.

When a tag decides that it has identified a periodic pattern of wakeup portions 102, it proceeds from block 153 to block 162. In block 162, the tag checks to see whether the software flag is set. If the flag is set, it means that the tag previously identified the periodic pattern, and has just confirmed that this periodic pattern is ongoing. On the other hand, if the flag is not set, then the tag has just identified a periodic pattern that it had not previously noted, and so the flag should be set. In particular, the tag proceeds from block 162 to block 163, and sets the flag. Further, the tag starts another of the timers 66 (FIG. 2), which is referred to here as a day timer. In the disclosed embodiment, the day timer has a duration of 24 hours. However, it could alternatively have any other suitable duration. The tag then proceeds to block 167, where it checks to see whether the day timer has expired. In the present discussion, since the tag has just started the day timer, the tag will find that the day timer has not expired. Accordingly, the tag will proceed to block 146 in order to begin the process of waiting for the next wireless signal from the reader.

It should be noted that, after the tag detects a periodic pattern and sets the flag, each time it thereafter detects the wakeup portion 102 of a wireless signal 101, the tag is diverted at block 153 to block 162, and thus does not pass through the blocks 157 and 161. In particular, the tag does not keep all of its circuitry turned on for the purpose of (1) receiving and storing the information from the collect portion 104 of the wireless signal 101, or (2) transmitting a reply to the wireless signal 101. Instead, the tag proceeds quickly through blocks 162, 163 and 167 to block 147, where it returns to its SLEEP mode, including turning off circuitry to reduce power consumption. In other words, the tag is still checking for and detecting each wakeup portion 102, but the tag is not performing the extra overhead of receiving the associated collect portion 104 and/or sending a reply. This reduces its power consumption and, over time, serves to significantly extend the effective operational life of its battery.

If the reader 38 suddenly changes its periodic pattern, for example by transmitting a new and different wireless signal at a point in time halfway between two of the wireless signals 101, the tag will realize at 153 that the periodic pattern has been disrupted, and the tag will proceed through blocks 156-158 in order to receive the new wireless signal, and then identify and handle its command. If the asset associated with the tag is moved from one physical location within the facility 12 to a different physical location within the facility 12, the tag may move from the region served by the reader 38 to a region served by a different reader. Even assuming that the two readers are transmitting wireless signals according to the same pattern, the patterns will normally not be fully synchronized, and will have transmission ranges that overlap to some extent. This will usually be sufficient so that, as the tag is moved, the tag will detect in block 153 a disruption to the periodic pattern of the original reader 38.

Alternatively, however, assume that the tag remains in the same location for several days, and that the reader 38 transmits only wireless signals 101 that contain the collection command, in a manner conforming closely to the periodic pattern shown in FIG. 3. Once the tag detects the periodic pattern and sets its flag, the tag will stop sending replies in order to conserve power, as discussed above. After two or three days, the reader would not know whether the reason it had not heard from the tag was (1) that the tag was suppressing replies in order to conserve power, or (2) that the tag and its asset had been removed from the facility and were no longer present. This is why the day timer discussed in blocks 163 and 167 is provided.

The day timer will expire 24 hours after the tag detects a periodic pattern. When the day timer expires, this will be detected at block 67, and the tag will proceed to block 68, where it will clear the software flag, and also clear stored data that it previously used to reach the conclusion that there was a periodic pattern of wireless signals. The tag will then proceed through blocks 157, 158 and 161 in order to receive the collect portion 104 of the current wireless signal. Since the data used by the tag to identify the periodic pattern was cleared in block 168, the tag will have to receive several wireless signals 101 before it can again identify the same periodic pattern. Consequently, the tag will need to reply in block 161 to several wireless signals before the tag again detects a periodic pattern and stops sending replies. Consequently, at least once per day, the tag will send several replies to the reader 38. Therefore, the reader will know the tag is still present within the facility 12.

Figure 5:
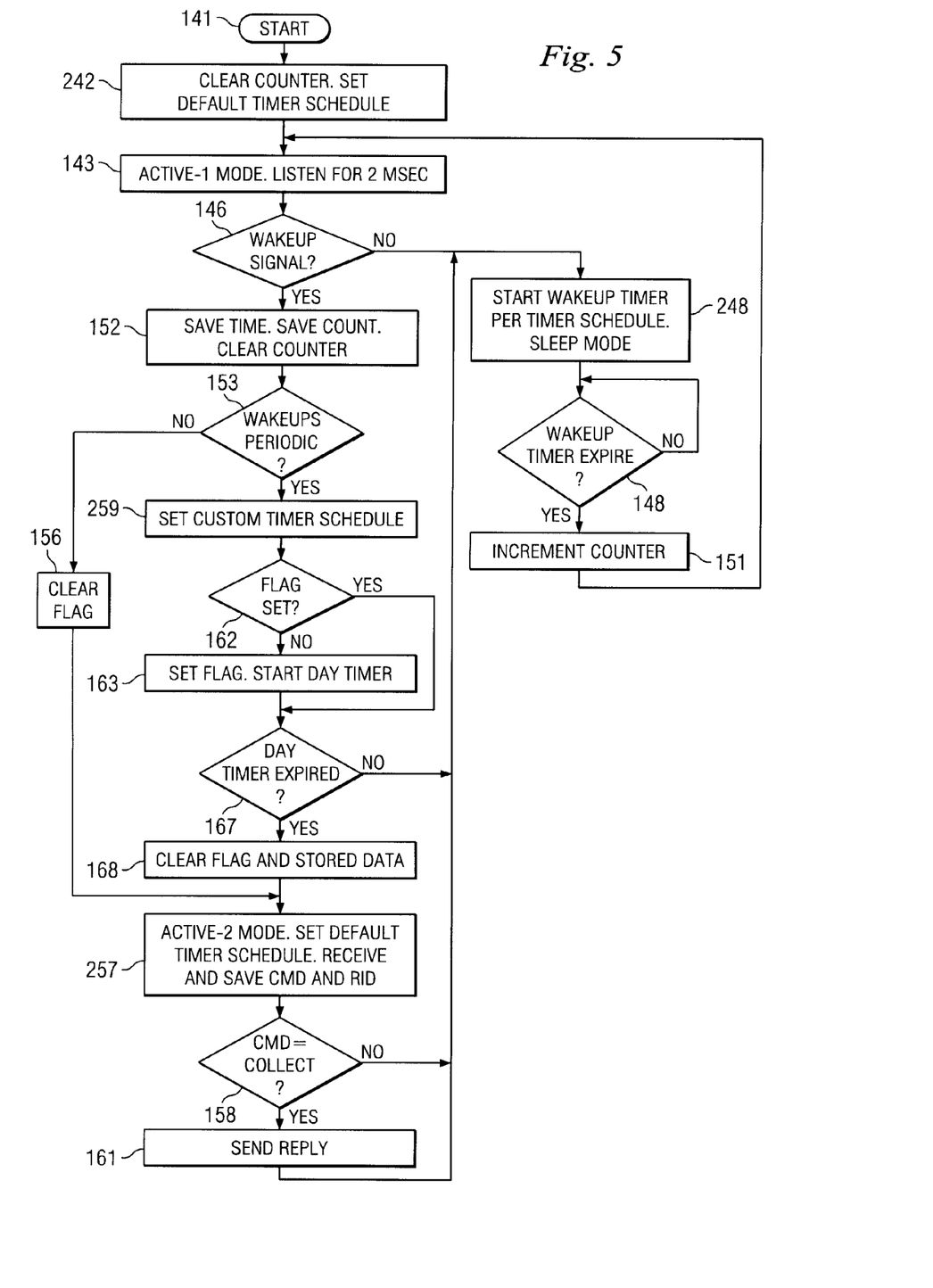
FIG. 5 is a flowchart showing a technique that is an alternative embodiment of the technique depicted in the flowchart of FIG. 4.

FIG. 5 is a flowchart showing a technique that can be used by each of the tags 31-36 to respond to polling inquiries from the reader 38, and that is an alternative embodiment of the technique depicted in the flowchart of FIG. 4. Most of the blocks in FIG. 5 represent processing that is effectively identical to processing carried out in FIG. 4, and FIG. 5 therefore identifies these blocks with the same reference numerals that were used in FIG. 4. The discussion that follows will focus on differences between FIGS. 4 and 5. In this regard, the blocks 142, 148 and 157 in FIG. 4 have been replaced with respective new blocks 242, 248 and 257. In addition, a new block 259 has been inserted between blocks 153 and 162.

As discussed above, the wakeup timer in the embodiment of FIG. 4 always has a fixed duration of 2.3 seconds. In contrast, a primary difference between the embodiments of FIGS. 4 and 5 is that, in the embodiment of FIG. 5, the duration of the wakeup timer is not fixed, but can vary. The purpose of varying the duration of the wakeup timer is to try to cause the tag to perform a wakeup detect (in block 143) at a point in time located approximately in the middle of the five second wakeup portion 102 of the next wireless signal 101.

For example, with reference to FIG. 3, while handling the wakeup portion 102 shown at the left side of FIG. 3, the duration of the wakeup timer would be set with the intent that a wakeup detect would occur approximately in the middle of the wakeup portion 102 on the right side of FIG. 3, or in other words at a point "T". One technique for doing this is to use a custom duration for the wakeup timer the first time it is started after receipt of a wakeup portion 102. After that, the wakeup timer would be repeatedly restarted with the standard duration of 2.3 seconds, until the next wakeup portion 102 is detected. As a specific example, it has been explained in association in FIG. 3 that the reader 38 transmits a new wakeup portion 102 every 30 seconds. Thus, upon detecting a wakeup portion 102, and knowing that the period is 30 seconds, the tag could start the wakeup timer once with a custom duration of 2.4 seconds, and then restart it twelve successive times with the predetermined duration of 2.3 seconds:

2.4 sec+(12×2.3 sec)=30 sec.

Alternatively, once the tag detects that the wakeup portions 102 are occurring in a periodic pattern, the tag could determine a custom duration, and use this custom duration every time that it starts the wakeup timer. Although the custom duration could be longer than 2.3 seconds, it can be advantageous to select a custom duration that is less than 2.3 seconds. In particular, as discussed above, this ensures that the tag will check for the wakeup portion 102 at least twice during each 5-second wakeup portion. As an example, with reference to FIG. 3, if the tag has determined that the reader is transmitting a wakeup portion 102 every 30 seconds, the tag could calculate a custom duration of 2.1429 seconds, and restart the wakeup timer with this custom duration 14 successive times. In particular:

(14×2.1429 sec)=30 sec.

An example of how either one of these two approaches can be carried out will now be described in detail with reference to FIG. 5. In block 242, the tag clears its software counter. Then, the tag sets a schedule for the wakeup timer. At this point, the tag has not yet evaluated whether or not there may be a periodic pattern of wireless signals. Therefore, the tag uses a default schedule, which calls for the wakeup timer to always be started using a fixed duration of 2.3 seconds.

Eventually, the tag may determine in block 153 that the wakeup portions 102 it has detected are occurring in a periodic manner, and then proceed to block 259. In block 259, the tag establishes a custom timer schedule, which replaces the default timer schedule adopted in block 242. The custom timer schedule will reflect one of the two approaches described above. In particular, the schedule may call for the timer to be started once with a custom duration, and to then be started several times with a predetermined duration of 2.3 seconds. Alternatively, the schedule may call for the timer to be restarted each time with the same custom duration, such as 2.1429 seconds. From block 259, the tag proceeds to block 162.

Block 248 is where the tag starts the wakeup timer. In particular, each time the tag enters block 248, it selects a respective duration for the wakeup timer from the current contents of the timer schedule. This may be the default schedule that was set up in block 242, or it may be a custom schedule that was established in block 259, depending on what has happened most recently. The tag then switches back to its SLEEP mode to reduce its power consumption, as described in more detail earlier, and proceeds to block 148.

At some point the tag may determine at block 153 that it is not currently able to identify a periodic pattern of wakeup portions 102. Alternatively, the tag may detect at block 167 that the day timer has expired. In either case, control will reach block 257. In block 257, the tag will set the timer schedule to be the default timer schedule mentioned above in association with block 242. This is because the tag currently believes there is no periodic pattern that can be used to calculate a custom timer schedule. Some other activity also occurs in block 257, and has already been described above in detail.

Figure 6:
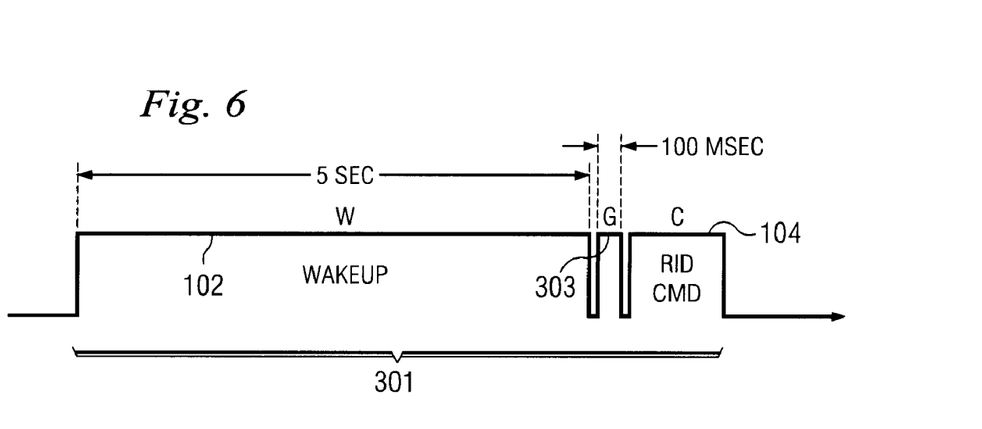
FIG. 6 is a timing diagram showing a wireless signal that is an alternative embodiment of the wireless signal shown in FIG. 3.

FIG. 6 is a timing diagram showing a wireless signal 301 that is an alternative embodiment of the wireless signal 101 shown in FIG. 3. The wireless signal 301 of FIG. 6 is effectively identical to the wireless signal 101 of FIG. 3, except for one difference. In this regard, it will be noted in FIG. 3 that there is a slight delay between the end of the wakeup portion 102 and the beginning of the collect portion 104. In FIG. 6, during this time delay, the reader transmits a guard portion "G" identified by reference numeral 303. The guard portion 303 is a 10 KHz tone that is very distinct from the 31.25 KHz tone of the wakeup portion 102, and that has a duration of 100 milliseconds. Transmission of the guard portion 303 by a reader is a technique that is already known from an industry standard promulgated by the International Organization for Standardization (ISO). However, according to an aspect of the present invention, tags can use this guard portion 303 in a unique manner to help conserve battery power, as discussed below.

Figure 7:
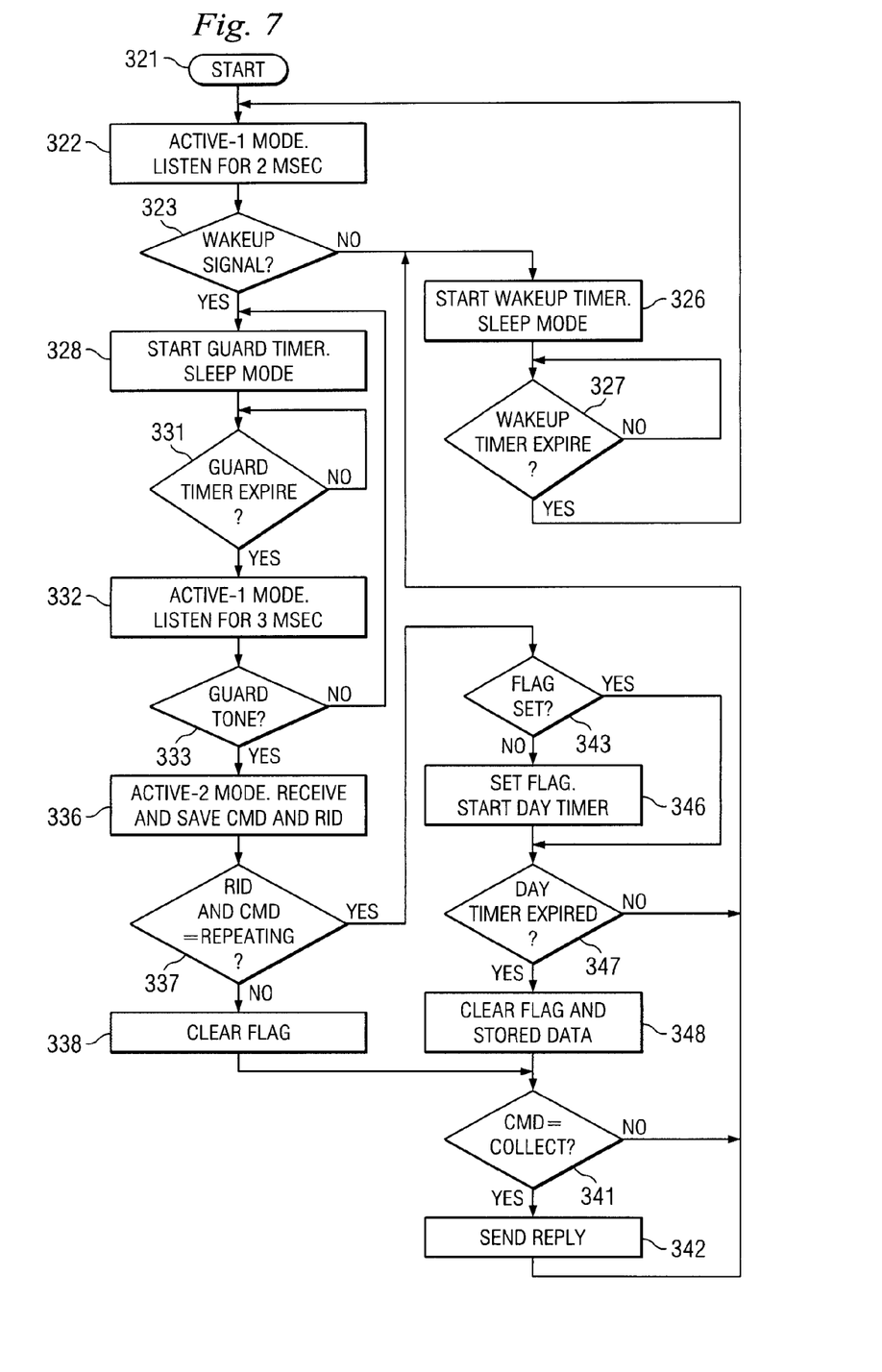
FIG. 7 is a flowchart showing a technique that is an alternative embodiment of the techniques depicted in the flowcharts of FIGS. 4 and 5.

FIG. 7 is a flowchart showing a technique that can be used by each of the tags 31-36 to respond to polling inquiries from the reader 38, and that is an alternative embodiment of the techniques depicted in the flowcharts of FIGS. 4 and 5. In FIG. 7, processing begins at block 321, and proceeds to block 322. In block 322, the tag switches to its ACTIVE-1 mode (if it is not already in the ACTIVE-1 mode), and turns on some circuitry that increases its power consumption. For example, the tag may turn on the receiver circuitry within its transceiver 67. Then, the tag listens for the presence of a wakeup portion 102. If a wakeup portion is detected, the tag proceeds immediately to block 323. Otherwise, if no wakeup portion is detected, the tag proceeds to block 323 after 2 milliseconds.

If no wakeup signal has been detected, the tag proceeds from 323 to block 326, where it starts the wakeup timer using a fixed duration of 2.3 seconds. It then switches to its SLEEP mode and turns off some circuitry to reduce its power consumption, for example by turning off the receiver circuitry within the transceiver. The tag then proceeds to block to 327, where it waits for the wakeup timer to expire. After 2.3 seconds, the wakeup timer expires, and the tag proceeds from block 327 back to block 322, in order check again for the presence of a wakeup portion 102.

Eventually, the tag will detect a wakeup portion 102, and will proceed from block 323 to block 328. In block 328, the tag starts another of its timers 66 (FIG. 2), which is referred to here as the guard timer. The guard timer has a fixed duration of 90 milliseconds. The tag then switches to its SLEEP mode and turns off some circuitry to reduce its power consumption, such as the receiver circuitry in its transceiver 67. The tag then proceeds to block 331, and waits 90 milliseconds for the guard timer to expire.

In essence, what is happening is that the tag was checking every 2.3 seconds for the wakeup portion 102 (in block 322). In the embodiments of FIGS. 4 and 5, the tag would sometimes remain in the power consuming mode for several seconds while it waited for and received the collect portion 104 of the wireless signal. In the embodiment of FIG. 7, when the tag detects the wakeup portion 102, it does not stay on continuously for several seconds to wait for the collect portion 104. Instead, it immediately returns to its low power SLEEP mode, and begins checking more frequently (every 90 milliseconds) for the presence of the guard portion 303. Once it detects the guard portion 303, it then stays on to receive the collect portion 104. Since the tag is in its SLEEP mode most of the time from detection of the wakeup portion 102 to detection of the guard portion 303, its power consumption is reduced.

In block 331 of FIG. 7, the tag is waiting for the 90 millisecond guard timer to expire. When the guard timer expires, the tag proceeds to block 332 and enters its ACTIVE-1 mode, turning on some circuitry such as its receiver circuitry, thereby increasing its power consumption. It then listens during a 3 millisecond interval for the guard portion 303. If the guard portion 303 has not yet occurred, then at block 333 the tag returns to block 328 to restart the guard timer and continue waiting for the guard portion 303. Since the 90 millisecond duration of the guard timer is slightly shorter than the 100 millisecond duration of the guard portion 303, the tag will eventually detect the occurrence of the guard portion 303, and then proceed from block 333 to block 336.

In block 336, the tag switches to its ACTIVE-2 mode and turns on some additional circuitry that increases its power consumption. For example, it may turn on the transmitter circuitry in its transceiver 67. It then receives the collect portion 104 of the wireless signal 301, and saves information such as the reader identification RID and the command CMD. The tag then proceeds to block 337, where it evaluates whether there is a repetition of wireless signals 301 that contain the same reader identification RID and the same command CMD. In the embodiments of FIGS. 4 and 5, the tag checked for a periodic pattern of signals. In the embodiment of FIG. 7, the wireless signals do not necessarily need to be periodic, so long as they are repetitive. If the tag cannot identify a repetitive pattern involving the same RID and CMD, it proceeds to block 338, where it clears the flag to indicate that the tag presently believes there is no repetitive pattern. The tag then proceeds to block 341, where it checks to see if the command CMD that it just received in the block 336 is a collect command. If so, then in block 342 it sends a reply to the reader in a form of a wireless signal. Then, the tag proceeds to block 326 in order to wait for the wakeup portion 102 of the next wireless signal 301.

Referring again to block 337, if the tag determines that there is a repetitive pattern, it proceeds to block 343 and checks to see whether the flag is set. If the flag is set, then the tag previously identified this pattern, and has just confirmed in block 337 that the pattern is continuing. On the other hand, if the tag determines at block 343 that the flag is not set, it means that in block 337 the tag just identified the repetitive pattern for the first time, and needs to set the flag. Therefore, the tag proceeds to block 346, where it sets the flag and starts the 24-hour day timer.

The tag then proceeds to block 347, where it checks to see if the day timer has expired. If the day timer has not expired, the tag proceeds to block 326, to begin the process of waiting for the wakeup portion 102 in the next wireless signal 301. On the other hand, if the tag determines in block 347 that the day timer has just expired, it means that the tag has been ignoring wireless signals from the reader for 24 hours, and needs to reply to a few wireless signals in order to let the reader know that the tag is still present in the facility 12. The tag therefore proceeds from block 347 to block 348, where it clears the flag, and also clears stored data that it used to identify the periodic pattern. The tag then proceeds to blocks 341-342, in order to transmit a reply to the reader. After the tag has received several wireless signals 301 and transmitted replies to them, and if the wireless signals still conform to the repetitive pattern, the tag will again detect the pattern, set the flag and start the day timer again, and ignore the reader for up to another 24 hours.

In the embodiments of FIGS. 4 and 5, when the tag has detected a periodic pattern, it ignores the collect portion 104 of all wireless signals that conform to the pattern. Consequently, if a wireless signal happens to conform to the pattern, the tag will ignore that signal even though the signal may possibly include a reader identification RID or a command CMD that differs from the RID or CMD underlying the periodic pattern. In other words, the tag may inadvertently ignore a wireless signal that is a deviation from the periodic pattern and to which the tag should theoretically respond. In contrast, in the embodiment of FIG. 7, the tag always receives in block 336 the collect portion 104 of every wireless signal 301, and always checks the reader identification RID and command CMD to see if they actually do conform to the repetitive pattern. Consequently, in the embodiment of FIG. 7, the tag will never inadvertently ignore a wireless signal 301 that does not conform to the repetitive pattern and to which the tag should respond.

As discussed above, in block 337 of FIG. 7, the tag checks for a repetitive pattern that does not necessarily have to be periodic. Alternatively, however, in block 337 the tag could check for a pattern in which the wireless signals not only are repetitive, but repeat in a periodic manner.

The embodiments of FIGS. 4-5 and 7 each provide lower power consumption and longer battery life than pre-existing tags. Further, the embodiments of FIGS. 4 and 5 each provide somewhat lower power consumption and somewhat longer battery life than the embodiment of FIG. 7. Consequently, the embodiment of FIG. 7 may be advantageous for situations where it is important that a tag not inadvertently ignore any wireless signals, whereas the embodiments of FIGS. 4-5 may be advantageous for situations where the longest possible battery life is desirable, and it is tolerable for a tag to occasionally inadvertently ignore a wireless signal to which it should theoretically respond.

The foregoing discussion assumes that the reader 38 is entirely conventional, regardless of whether it is transmitting wireless signals according to the protocol shown in FIG. 3 or the protocol shown in FIG. 6. Consequently, the various unique techniques for tag operation that are shown in FIGS. 4-5 and 7 each allow new tags utilizing these techniques to be used in existing facilities, without any need to incur the expense of changing any of the pre-existing readers that are already installed in those facilities. In other words, the techniques disclosed in FIGS. 4-5 and 7 are each backward compatible with existing readers.

Alternatively, of course, the existing readers could be replaced with new readers that are aware of the power-saving techniques that can be used by tags, as described above. In that case, when a reader is transmitting wireless signals that contain collect commands, the reader can adhere strictly to a periodic schedule of transmissions, so that the tags can easily detect the periodic nature of these transmissions and utilize their power-saving techniques. And if at some point the reader needs to send a wireless signal containing a command other than a collect command, the reader can intentionally transmit that wireless signal at a point in time that clearly differs from the points in time associated with the periodic pattern. In each of the embodiments of FIGS. 4 and 5, the tags will determine at block 153 that there has been a disruption to the periodic pattern, and will therefore receive and process that wireless signal, rather than ignoring it.

Although selected embodiments have been illustrated and described in detail, it should be understood that a variety of substitutions and alterations are possible without departing from the spirit and scope of the present invention, as defined by the claims that follow.

What is claimed is:

1. A method of operating a tag that can receive wireless signals having successive first and second portions, comprising:
   periodically switching from a first mode of operation to a second mode of operation, said tag consuming less power in said first mode than in said second mode;
   checking while in said second mode for concurrent receipt by said tag of the first portion of one of the wireless signals;
   evaluating previously-received wireless signals to identify wireless signals that are equivalent and occur repetitively;
   if no repetitive wireless signals have been identified, receiving in said tag the second portion of a wireless signal detected during said checking, and thereafter switching from said second mode back to said first mode; and
   if repetitive wireless signals have been identified, switching from said second mode back to said first mode after detection of the first portion of a wireless signal and before receipt of the second portion thereof.

2. A method according to claim 1, including responding to the presence of a predetermined command received in the second portion of a wireless signal by transmitting a wireless reply.

3. A method according to claim 1, including responding to continuous detection of said repetitive wireless signals for a selected time interval by canceling a determination that repetitive wireless signals have been identified.

4. A method according to claim 1, including responding to receipt of a wireless signal that differs from the repetitive wireless signals by canceling a determination that repetitive wireless signals have been identified.

5. A method according to claim 1, wherein said evaluating of previously-received wireless signals includes determining that there are repetitive wireless signals only if the equivalent wireless signals repeat according to a periodic pattern.

6. A method according to claim 5, including responding to receipt of a wireless signal that fails to conform to said periodic pattern by canceling the determination that said periodic pattern has been identified.

7. A method according to claim 5, including defining a series of time periods and carrying out at the end of each of said time periods a respective switching transition of said periodic switching, said defining of said time periods including:
   defining successive sets of said time periods that each begin with one said time period of selected length followed by at least one further said time period of predetermined length; and
   responding to detection of said periodic pattern by setting said selected length as a function of a period of said periodic pattern.

8. A method according to claim 7, wherein said setting of said selected length is carried out so that each said set has a duration that is approximately equal to one period of said periodic pattern.

9. A method according to claim 5, including:
   defining a series of time periods of selected length and carrying out at the end of each of said time periods a respective switching transition of said periodic switching; and
   responding to detection of said periodic pattern by setting said selected length as a function of a period of said periodic pattern.

10. A method according to claim 9,
    wherein said defining of said time periods includes defining successive sets of said time periods that each contain at least two of said time periods; and
    wherein said setting of said selected length is carried out so that a duration of each said set is approximately equal to one period of said periodic pattern.

11. A method according to claim 5, including:
    maintaining a count of switching transitions of said periodic switching that occur between each successive pair of received first portions of the wireless signals; and
    carrying out said evaluating of whether there is a periodic pattern as a function of said counts.

12. A method according to claim 11, wherein said evaluating of whether there is a periodic pattern includes determining whether each of the counts falls within a range of count values.

13. A method of operating a tag that can receive wireless signals having successive first, second and third portions, comprising:
    periodically switching at a first rate from a first mode of operation to a second mode of operation, said tag consuming less power in said first mode than in said second mode;
    checking while in said second mode for concurrent receipt by said tag of the first portion of one of the wireless signals;
    switching from said second mode back to said first mode in the absence of detection of the first portion of a wireless signal;
    responding to detection in said second mode of the first portion of a wireless signal by:
       returning to said first mode;

thereafter periodically switching at a second rate faster than said first rate from said first mode to a third mode of operation, said tag consuming less power in said first mode than in said third mode;

checking while in said third mode for concurrent receipt by said tag of the second portion of the wireless signal;

switching from said third mode back to said first mode in the absence of detection of the second portion of a wireless signal; and responding to detection of the second portion of the wireless signal while in said third mode by remaining in said third mode and receiving the third portion of the wireless signal.

14. A method according to claim 13, responding to the presence of a predetermined command in the third portion of a received wireless signal by transmitting a wireless reply.

15. A method according to claim 14, including:
evaluating previously-received wireless signals to identify wireless signals that are equivalent and occur repetitively; and
responding to subsequent receipt of repetitive wireless signals by inhibiting said transmitting of a wireless reply.

16. A method according to claim 15, including ceasing said inhibiting of said transmitting of a wireless reply after said inhibiting has been carried out for a selected time interval.

17. A method according to claim 15, including responding to receipt of a wireless signal that differs from the repetitive wireless signals by ceasing said inhibiting of said transmitting of a wireless reply.

18. A method according to claim 15, wherein said evaluating of previously-received wireless signals includes determining that there are repetitive wireless signals only if the equivalent wireless signals repeat according to a periodic pattern.

19. A method according to claim 18, including ceasing said inhibiting of said transmitting of a wireless reply in response to receipt of a wireless signal that fails to conform to said periodic pattern.

20. An apparatus comprising a tag having circuitry that can receive wireless signals with successive first and second portions, and that causes said tag to:
periodically switch from a first mode of operation to a second mode of operation, said tag consuming less power in said first mode than in said second mode;
check while in said second mode for concurrent receipt of the first portion of one of the wireless signals;
evaluate previously-received wireless signals to identify wireless signals that are equivalent and occur repetitively;
receive the second portion of a wireless signal detected during said checking if no repetitive wireless signals have been identified, and thereafter switch from said second mode back to said first mode; and
switch from said second mode back to said first mode after detection of the first portion of a wireless signal and before receipt of the second portion thereof, if repetitive wireless signals have been identified.

21. An apparatus according to claim 20, wherein said circuitry responds to the presence of a predetermined command received in the second portion of a wireless signal by causing said tag to transmit a wireless reply.

22. An apparatus according to claim 20, wherein said circuitry responds to continuous detection of said repetitive wireless signals for a selected time interval by causing said tag to cancel a determination that repetitive wireless signals have been identified.

23. An apparatus according to claim 20, wherein said circuitry respond to receipt by said tag of a wireless signal that differs from the repetitive wireless signals by causing said tag to cancel a determination that repetitive wireless signals have been identified.

24. An apparatus according to claim 20, wherein to carry out said evaluation of previously-received wireless signals said circuitry causes said tag to determine there are repetitive wireless signals only if the equivalent wireless signals repeat according to a periodic pattern.

25. An apparatus according to claim 24, wherein said circuitry responds to receipt of a wireless signal that fails to conform to said periodic pattern by causing said tag to cancel the determination that said periodic pattern has been identified.

26. An apparatus according to claim 24, wherein said circuitry further causes said tag to define a series of time periods and carry out at the end of each of said time periods a respective switching transition of said periodic switching, and wherein to effect the definition of said time periods said circuitry causes said tag to:
define successive sets of said time periods that each begin with one said time period of selected length followed by at least one further said time period of predetermined length; and
respond to detection of said periodic pattern by setting said selected length as a function of a period of said periodic pattern.

27. An apparatus according to claim 26, wherein said circuitry further causes said tag to select said selected length so that each said set has a duration that is approximately equal to one period of said periodic pattern.

28. An apparatus according to claim 24, wherein said circuitry further causes said tag to:
define a series of time periods of selected length and carry out at the end of each of said time periods a respective switching transition of said periodic switching; and
respond to detection of said periodic pattern by setting said selected length as a function of a period of said periodic pattern.

29. An apparatus according to claim 28,
wherein to effect the definition of said time periods said circuitry causes said tag to define successive sets of said time periods that each contain at least two of said time periods; and
wherein said circuitry causes said tag to select said selected length so that a duration of each said set is approximately equal to one period of said periodic pattern.

30. An apparatus according to claim 24, wherein said circuitry further causes said tag to:
maintain a count of switching transitions of said periodic switching that occur between each successive pair of received first portions of the wireless signals; and
carry out the evaluation of whether there is a periodic pattern as a function of said counts.

31. An apparatus according to claim 30, wherein to effect the evaluation of whether there is a periodic pattern said circuitry causes said tag to determine whether each of the counts falls within a range of count values.

32. An apparatus comprising a tag having circuitry that can receive wireless signals with successive first, second and third portions, and that causes said tag to:
periodically switch at a first rate from a first mode of operation to a second mode of operation, said tag consuming less power in said first mode than in said second mode;

check while in said second mode for concurrent receipt of the first portion of one of the wireless signals;

switch from said second mode back to said first mode in the absence of detection of the first portion of a wireless signal;

respond to detection in said second mode of the first portion of a wireless signal by proceeding to:

return to said first mode;

thereafter periodically switch at a second rate faster than said first rate from said first mode to a third mode of operation, said tag consuming less power in said first mode than in said third mode;

check while in said third mode for concurrent receipt by said tag of the second portion of the wireless signal;

switch from said third mode back to said first mode in the absence of detection of the second portion of a wireless signal; and respond to detection of the second portion of the wireless signal while in said third mode by remaining in said third mode and receiving the third portion of the wireless signal.

33. An apparatus according to claim 32, wherein said circuitry responds to the presence of a predetermined command in the third portion of a received wireless signal by causing said tag to transmit a wireless reply.

34. An apparatus according to claim 33, wherein said circuitry further causes said tag to:

evaluate previously-received wireless signals to identify wireless signals that are equivalent and occur repetitively; and respond to subsequent receipt of repetitive wireless signals by inhibiting said transmitting of a wireless reply.

35. An apparatus according to claim 34, wherein said circuitry causes said tag to cease said inhibiting of transmission of a wireless reply after said inhibiting has been carried out for a selected time interval.

36. An apparatus according to claim 34, wherein said circuitry responds to receipt of a wireless signal that differs from the repetitive wireless signals by causing said tag to cease said inhibiting of transmission of a wireless reply.

37. An apparatus according to claim 34, wherein to effect the evaluation of previously-received wireless signals said circuitry causes said tag to determine that there are repetitive wireless signals only if the equivalent wireless signals repeat according to a periodic pattern.

38. An apparatus according to claim 37, wherein said circuitry responds to receipt of a wireless signal that fails to conform to said periodic pattern by causing said tag to cease said inhibiting of transmission of a wireless reply.

* * * * *